Figure 1:
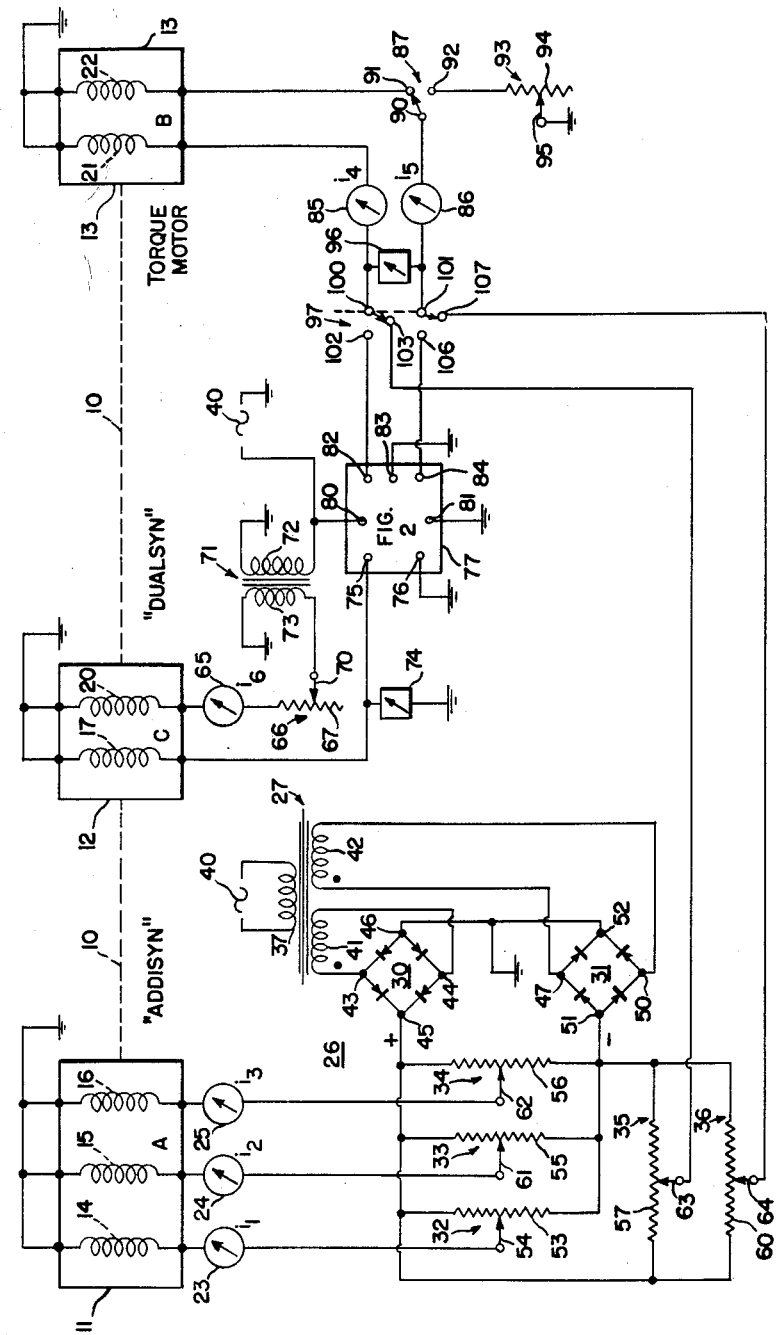

Jan. 5, 1960   C. R. BONNELL   2,919,857
TORQUE INTEGRATING ANALOG COMPUTERS WITH INDUCTIVE DEVICE
Filed Sept. 28, 1953   3 Sheets-Sheet 1

INVENTOR.
CHARLES R. BONNELL
BY George H Fisher
ATTORNEY

Jan. 5, 1960  C. R. BONNELL  2,919,857
TORQUE INTEGRATING ANALOG COMPUTERS WITH INDUCTIVE DEVICE
Filed Sept. 28, 1953  3 Sheets-Sheet 2

INVENTOR.
CHARLES R. BONNELL
BY George H. Fisher
ATTORNEY

Jan. 5, 1960 C. R. BONNELL 2,919,857
TORQUE INTEGRATING ANALOG COMPUTERS WITH INDUCTIVE DEVICE
Filed Sept. 28, 1953 3 Sheets-Sheet 3
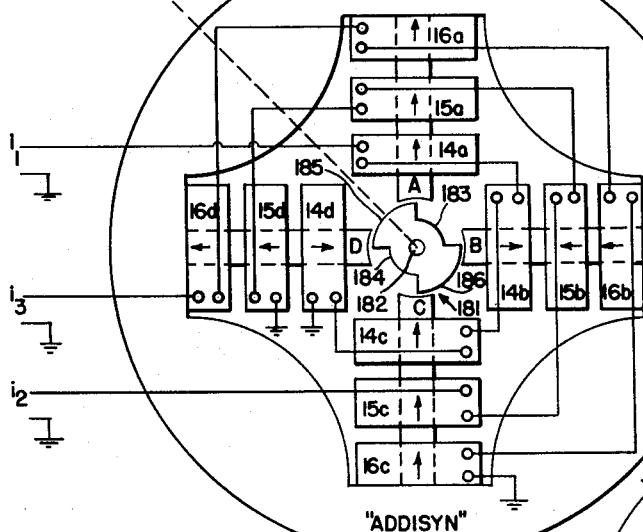
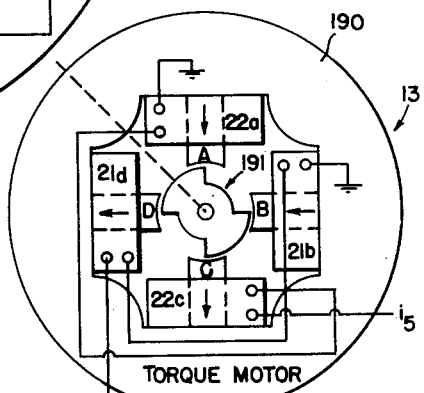
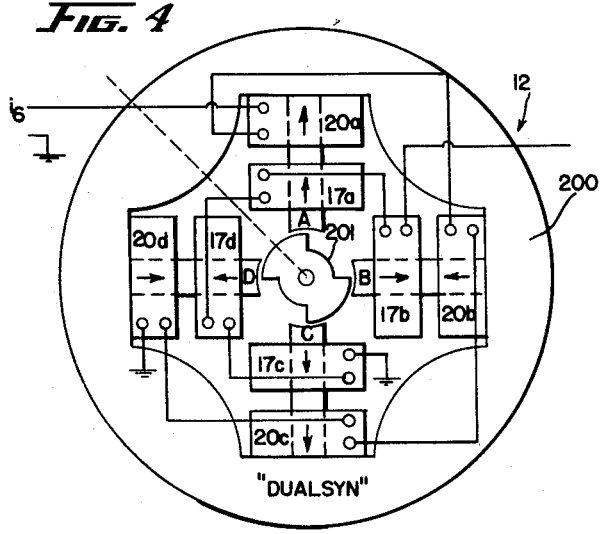
INVENTOR.
CHARLES R. BONNELL
BY George H Fisher
ATTORNEY United States Patent Office
2,919,857
Patented Jan. 5, 1960

2,919,857
TORQUE INTEGRATING ANALOG COMPUTERS WITH INDUCTIVE DEVICE

Charles R. Bonnell, Columbia Heights, Minn., assignor to Minneapolis-Honeywell Regulator Company, Minneapolis, Minn., a corporation of Delaware Application September 28, 1953, Serial No. 382,655

8 Claims. (Cl. 235—193)

This invention relates to the field of computing apparatus of the analog type, more particularly to such apparatus in which the analog is one of torque, and to an improved inductive device peculiarly adapted for general utility in torque analog computing apparatus.

It is an object of the invention to provide a novel electromagnetic torque integrating analog computer, in which data is stored in torque form and in which a plurality of inductive devices are arranged to supply torques to a common shaft as various functions of the currents supplied to the devices and of the angular displacement of the shaft, so that the desired computed result may be determined, after suitable adjustment of the appropriate currents, by measurement of an appropriate further current or of the rotation of the shaft.

It is another object of the invention to provide a novel inductive device for such a computer, including a rotor and a plurality of stator windings, having a torque output which may be a function of the sum of two currents, or of the product of two currents, or of a more complex current relation, according to the procedure followed in using the device.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1 is a wiring diagram showing a computer according to the invention, and

Figures 2, 3, 4, and 5 give details of components of Figure 1.

Referring now to Figure 1, a shaft 10 is shown as connected to a first inductive device or Addisyn 11, a second inductive device or Dualsyn 12, and a third inductive device or torque motor 13. Device 11 is shown to comprise a plurality of windings 14, 15, and 16, and is shown in more detail in Figure 3. Device 12 is shown to comprise a pair of windings 17 and 20, and is shown in more detail in Figure 4. Device 13 is shown to comprise a pair of windings 21 and 22, and is shown in more detail in Figure 5.

The windings of device 11 are shown as energized through current meters 23, 24, and 25 respectively from a source of electrical energy indicated generally by the reference numeral 26, which is shown to comprise a transformer 27, a pair of rectifier bridges 30 and 31, and a plurality of voltage dividers 32, 33, 34, 35, and 36.

Transformer 27 is shown to comprise a primary winding 37 energized from a suitable source 40 of alternating voltage of a selected frequency, and a pair of secondary windings 41 and 42. Bridge 30 is shown as having input terminals 43 and 44 energized from primary winding 41, and output terminals 45 and 46. Similarly bridge 31 is shown as having input terminals 47 and 50 energized from primary winding 42, and output terminals 51 and 52. Voltage divider 32 is shown to comprise a resistance member 53 and a slider 54: in the same way voltage dividers 33, 34, 35 and 36 are shown to comprise resistance members 55, 56, 57 and 60 and sliders 61, 62, 63 and 64.

Winding 20 of device 12 is energized from source 40 through a current indicator 65, which may conveniently be of the dual range type, a variable resistor 66 having a resistance member 67 and a slider 70, and a transformer 71 having a primary winding 72 connected to source 40 and a secondary winding 73 connected to resistor 66. Winding 17 of device 12 energizes a voltage indicator 74 and the input terminals 75 and 76 of an amplifier 77 best shown in Figure 2. Amplifier 77 is energized at power terminals 80 and 81 from source 40, and has a plurality of output terminals 82, 83 and 84.

Winding 21 of device 13 is energized through current indicator 85, and winding 22 of device 13 is energized through current indicator 86 under the control of a switch 87 having a movable contact 90 and a pair of fixed contacts 91 and 92. Associated with switch 87 is a variable resistor 93 having a resistance member 94 and a slider 95.

A voltage indicator 96 is associated with current indicators 85 and 86, and the energization of device 13 takes place under the control of a switch generally indicated by the reference numeral 97 having a pair of movable contacts 100 and 101, movable with respect to fixed contacts 102, 103 and 106, 107 respectively.

Figure 2:
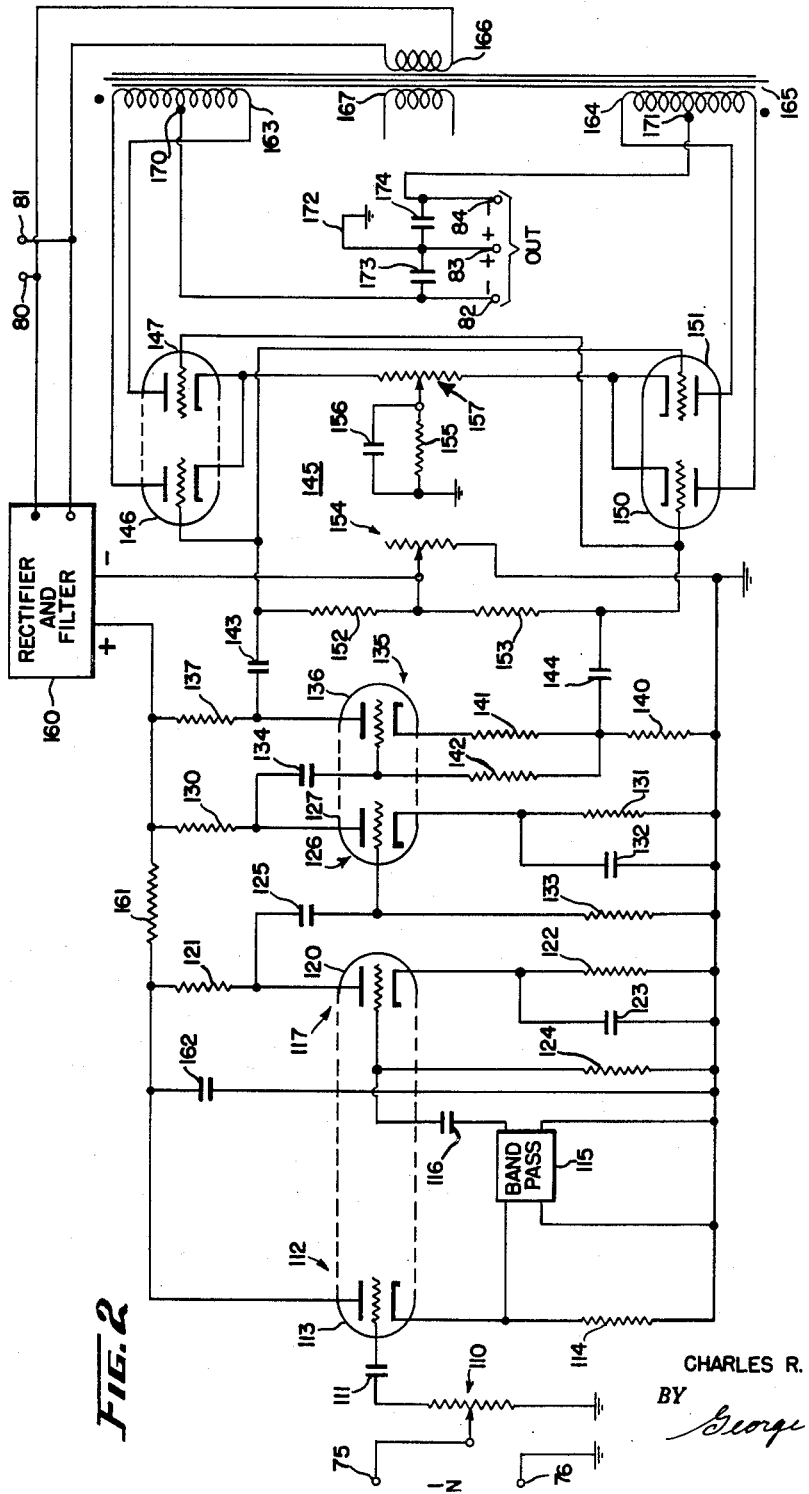

As shown in Figure 2 the signal supplied to terminals 75 and 76 of amplifier 77 is fed to a gain control 110 and then through a coupling capacitor 111 to a cathode follower stage 112 including a triode 113 and a cathode resistor 114. The output from the cathode follower stage is coupled through a band pass filter 115 and a coupling capacitor 116 to a voltage amplifier stage 117 including a triode 120, a plate resistor 121, a cathode resistor 122, a cathode bypass capacitor 123, and a grid resistor 124. The output of amplifier stage 117 is connected through a coupling capacitor 125 to a further voltage amplifier 126 including a triode 127, a plate resistor 130, a cathode resistor 131, a cathode bypass capacitor 132, and a grid resistor 133. The output of stage 126 is connected through a coupling capacitor 134 to a phase inverter stage 135 including a triode 136, output resistors 137 and 140, a bias resistor 141, and a grid resistor 142. The output of phase inverter 135 is supplied through a pair of coupling capacitors 143 and 144 to a full-wave phase sensitive discriminator shown to include triodes 146, 147, 150 and 151, grid resistors 152 and 153, a variable resistor 154 for adjusting bias, a cathode resistor 155 and bypass capacitor 156, and a balancing voltage divider 157. Anode potential for amplifier stage 126 and phase inverter stage 135 is supplied directly from a rectifier and filter indicated by the reference numeral 160. Anode voltage for cathode follower stage 112 and voltage amplifier stage 117 is provided from unit 160 through a further filter stage including a resistor 161 and a capacitor 162. Anode voltage for triodes 146, 147, 150, and 151 on the other hand is supplied in the form of alternating voltage from the secondary windings 163 and 164 of a transformer 165 having a primary winding 166 and a further secondary winding 167. Secondary windings 163 and 164 are center tapped at 170 and 171, and these center taps are connected to output terminals 82 and 84 respectively. Output terminal 83 is grounded at 172, and filter capacitors 173 and 174 are provided to smooth the output appearing at terminals 82, 83, and 84. Primary winding 166 and rectifier and filter 160 are energized with alternating voltage from source 40 at terminals 80 and 81.

The operation of the amplifier just described will now be understood. In initially setting up the apparatus, variable resistor 154 and voltage divider 157 are adjusted so that with no signal supplied to input terminals 75 and 76, triodes 146, 147, 150, and 151 all conduct equally in the half cycles of source 40 during which their anodes are positive. From this it follows that terminals 82 and 84 are equally negative with respect to terminal 83, the loads in the two output circuits 82, 83, and 84, 83 being equal. It will moreover be apparent that under these conditions terminals 82 and 84 are at the same potential. If an alternating voltage is applied to terminals 75 and 76, this voltage appears on the grids of discriminator tubes. By reason of phase inverter stage 135 this voltage acts to increase the discharge in two of the triodes and to decrease the discharge in the other two triodes, so that over a full cycle of operation more current may flow between terminals 82 and 83, for example, than flows between terminals 84 and 83. The arrangement is such that for any phase and magnitude of input voltage within the range of the amplifier, the sum of the currents through equal output impedances is the same although their difference is proportional to the input signal. The output connections are such that voltage indicator 96 of Figure 1 gives an indication of the difference between the two voltages.

Turning now to Figure 3, device 11 is shown to comprise a stator core 180 of ferromagnetic material having a plurality of inwardly directed salient poles A, B, C, and D. It has been found economical in construction to have the axes of these poles extend radially to intersect at right angles at a common point, so that the poles can be divided into diametrically opposed pairs A, C and B, D. The inner ends of the salient poles are best provided with cylindrical surfaces concentric about the intersection of the axes of the poles.

Windings 14, 15, and 16 of Figure 1 are each divided into four portions, one portion appearing on each pole of stator 180. Thus winding 14 comprises in Figure 3 the inner coils 14a, 14b, 14c, and 14d, winding 15 of Figure 1 comprises coils 15a, 15b, 15c, and 15d of Figure 3, and winding 16 of Figure 1 comprises coils 16a, 16b, 16c, and 16d of Figure 3. It is important, however, that the interconnections between the various coils be made in the proper manner, if operation of the device in the desired fashion is to take place.

Windings 14a, 14b, 14c, and 14d are connected in series in such a fashion that the fluxes induced in poles A and C by current flowing in the series circuit have the same direction, and so that the like fluxes induced in poles B and D also have the same direction. Windings 15a, 15b, 15c, and 15d are likewise connected in series circuit, but the connection is such that when current of the same sense flows in the second series circuit, the flux produced in poles A and C reinforces the flux resulting from current in coils 14a and 14c while the flux in poles B and D resulting from the second current opposes that in poles B and D resulting from current in coils 14b and 14d. Similarly coils 16a, 16b, 16c and 16d are connected in a series circuit so that the magnetic fluxes resulting have the same polarity as those just described in connection with windings 15.

Associated with the stator just described is a rotor 181 having a special configuration, and mounted on a shaft 182 for rotation about an axis perpendicular to the axes of the salient poles. The general configuration of rotor 181 includes a pair of quadrants of small radius 183 and 184, a pair of quadrants of large radius 185 and 186, and radial straight lines connecting the quadrants. It has been found that if the quadrants 185 and 186 are ground to non-circular outlines, the output of the device in some applications is more linear, but the choice of this refinement is optional with the user.

The torque output of device 11 resulting when the windings in stator 180 are energized with currents $i_1$, $i_2$, and $i_3$ is given by the equation:

$$T_A = k_1 i_1 (k_2 i_2 + k_3 i_3) \quad (1)$$

Here the constants $k_1$, $k_2$, and $k_3$ depend on physical characteristics of the coils making up the windings, such as the number of turns, etc.

Turning now to Figure 5, device 13 is shown to comprise a stator core 190 of ferromagnetic material having a plurality of salient poles A, B, C, and D whose axes intersect perpendicularly at a common point. Winding 21 is shown to comprise a pair of coils 21b and 21d mounted on poles B and D of core 190 and connected in series so that when current flows in the two coils the magnetic fluxes resulting have the same direction. Similarly, winding 22 is shown to comprise a pair of cores 22a and 22c mounted on poles A and C of core 190, and connected in series so that when current flows in the series circuit the fluxes induced in poles A and C have the same direction. Device 13 also includes a rotor 191 similar in all respects to rotor 181 described in connection with device 11.

The torque output of device 13 resulting when the windings on stator 190 are energized with currents $i_4$ and $i_5$ is given by the equation:

$$T_B = k_4 i_4^2 - k_5 i_5^2 \quad (2)$$

Here again the constants $k_4$ and $k_5$ are determined by physical characteristics of the coils making up the windings.

Turning now to Figure 4, device 12 is shown to comprise a stator core 200 of ferromagnetic material having a plurality of salient poles A, B, C, and D whose axes intersect at a common point. Winding 20 of device 12 is shown in Figure 4 to comprise coils 20a, 20b, 20c, and 20d, connected in series so that if current flows in the series circuit the fluxes in poles A and C resulting from the current have opposite directions, and the fluxes in poles B and D resulting from the current also have opposite directions. Winding 17 of device 12 is shown to comprise a plurality of coils 17a, 17b, 17c and 17d connected in a series circuit such that if current were to flow in that circuit the resulting fluxes in poles A and C would have the same sense as those resulting from energization of coils 20, while the fluxes resulting in poles B and D would have the opposite direction to the fluxes resulting from energization of coils 20. Device 12 also includes a rotor 201 having the same characteristics as that described in connection with Figure 3.

The torque output of device 12 resulting when winding 20 is energized with a current $i_6$ is given by the equation:

$$T_C = k_c i_6^2 \theta \quad (3)$$

Here $k_c$ is determined by the physical characteristics of winding 20, and $\theta$ is the angle of rotation of rotor 201 from the position shown in Figure 4.

Another characteristic of device 12 is that, if $i_6$ is alternating at a frequency $f$, there is induced in winding 17 a voltage $e$ defined by the equation:

$$e = k_e f i_6 \theta \quad (4)$$

Here $k_c$ is determined by characteristics of windings 17 and 20 consistent with the definition of $k_c$ given above. The frequency $f$ may ordinarily be considered a constant.

Operation

In considering the operation of the apparatus as a whole, attention is first directed to the fact that the torque T about shaft 10 is expressed in the equation:

$$T = T_A - T_B - T_C \qquad (5)$$

Here $T_A$, $T_B$, and $T_C$ are defined in Equations 1, 2, and 3 above, so that Equation 5 may be expanded to read:

$$T = k_1 i_1 (k_2 i_2 + k_3 i_3) - (k_4 i_4^2 - k_5 i_5^2) - k_c i_6^2 \theta \qquad (6)$$

A number of simplifications may be accomplished by suitable selection of structural details. The windings on device 11 may be so constructed that $k_1 = k_2 = k_3 = k_A$, and those on device 13 may be so constructed that $k_4 = k_5 = k_B$. Equation 6 may now be rewritten:

$$T = k_A^2 i_1 (i_2 + i_3) - k_B (i_4^2 - i_5^2) - k_c i_6^2 \theta \qquad (7)$$

Equation 4 may be rewritten to read:

$$\theta = \frac{e}{k_e f i_6} \qquad (8)$$

The basic operation of the apparatus results in a static condition in which shaft 10 does not rotate: the value of T in this condition is of course zero. Equation 6 may again be rewritten, to represent this condition, as follows:

$$k_A^2 i_1 (i_2 + i_3) - k_B (i_4^2 - i_5^2) = \frac{k_c i_6}{k_e f} e \qquad (9)$$

The apparatus may be used in two different fashions, which are identified herein by the descriptive terms "open loop" and "closed loop" because of their analogy to servo theory. In the open loop configuration switch 97 is in its counterclockwise position as shown, so that the currents indicated by indicators 85 and 86 are supplied from sliders 63 and 64: indicator 96 is not of significance in this configuration of that apparatus.

When it is desired to perform multiplication of a monomial by a binomial, slider 54 is adjusted until the current $i_1$ indicated by indicator 23 is representative of the monomial to be multiplied, and sliders 61 and 62 are adjusted until the currents $i_2$ and $i_3$ indicated by indicators 24 and 25 are representative of the terms of the binomial. Sliders 63 and 64 are centered so that currents $i_4$ and $i_5$ indicated by indicators 85 and 86 are zero, and slider 70 is adjusted to give an arbitrary constant value of $i_6$. Equation 9 now degenerates to the proportion:

$$e :: i_1 (i_2 + i_3) \qquad (10)$$

and by reading $e$ on a suitably chosen scale, as on indicator 74, the value of the product is determined. Simple multiplication of monomials may be accomplished by setting either $i_2$ or $i_3$ to zero.

When it is desired to use the apparatus for adding two numbers, slider 54 is adjusted to set $i_1$ at some arbitrary value. Slider 61 is adjusted until the current $i_2$ is representative of one of the numbers to be added and slider 62 is adjusted until the current $i_3$ is representative of the other number. Sliders 63 and 64 are centered as before, and slider 70 is again adjusted to give an arbitrary constant value of $i_6$. Equation 9 now degenerates to the proportion:

$$e :: i_2 + i_3 \qquad (11)$$

and by reading $e$ on indicator 74 the value of the sum is determined.

It is particularly pointed out that the showing of only three windings on the poles of stator 180 is for simplification only: by providing a larger number of windings on the poles the number of quantities which can be added by this method may be proportionately increased.

It should also be pointed out that both in addition and in multiplication the numbers operated upon are represented by currents in the first power, not in the second power.

Square root may also be taken using the open loop configuration of the apparatus. To take the square root of the product of a monomial multiplied by a binomial, sliders 54, 61 and 62 are adjusted, as described in connection with multiplication, until currents $i_1$, $i_2$, and $i_3$ respectively represent the monomial and the terms of the binomial. Slider 70 is adjusted to reduce $i_6$ to zero. Slider 64 is centered and slider 63 is adjusted until the torque supplied by device 13 is sufficient to just balance the torque supplied by device 11. Equation 9 now degenerates to the proportion:

$$i_4^2 :: i_1 (i_2 + i_3) \qquad (12)$$

and by reading $i_4$ on indicator 85 the value of the desired root is determined.

By holding $i_1$ at some arbitrary constant value, it is possible to compute the square root of a binomial: square roots of more simplified quantities may be taken by obvious modifications of the apparatus.

A further specific computation which may be performed in the open loop condition of the system comprises determining the difference between the squares of two variables. To perform this computation, sliders 54, 61, and 62 are centered to make $i_1$, $i_2$, and $i_3$ zero. Slider 63 is set to the value of the variable whose square is to be the minuend, slider 64 is set to the value of the variable whose square is to be the subtrahend, and slider 70 is set to give an arbitrary constant value for $i_6$. Equation 9 now generates to the proportion $$e :: i_4^2 - i_5^2 \qquad (13)$$

and by reading $e$ on indicator 74 the value of the difference of the two squares is determined.

Closed loop operation of the apparatus is brought about by moving switch 97 to its clockwise position and by adjusting slider 70 so that $i_6$ is reduced to so small a value that the torque $T_C$ is negligible compared to torques $T_A$ and $T_B$, although $i_6$ cannot be made zero. By means of amplifier 77 the extremely small value of $e$ is still made use of to supply currents from terminals 82 and 84 through windings 21 and 22 to ground. Proper adjustment of the amplifier for the case where the windings are of equal impedance results in currents $i_4$ and $i_5$ whose sum is constant and whose difference is proportional to $e$. Equation 9 now degenerates to the proportion:

$$i_1 (i_2 + i_3) :: i_4 - i_5 \qquad (14)$$

The reading of indicator 96 is proportional to $i_4 - i_5$, so that multiplication and addition are performed as described above, except that the sums and products are now read on indicator 96 instead of on indicator 74.

Square root may also be taken in the closed loop configuration of the apparatus. For this purpose $i_5$ is reduced to zero in its effect on device 13, by moving switch 87 to its clockwise position: this substitutes variable resistor 94 for winding 22 so that the load on amplifier 77 is not unbalanced. Square roots are now computed as in the open loop configuration except that the computed root is read on indicator 96 rather than on indicator 74.

From the foregoing it will be evident that I have invented an improved analog computer in which the analog used is torque rather than voltage, and also that the computer proper may be constructed in very compact form requiring only one moving part, shaft 10 carrying rotors 181, 191, and 201. As a component of this computer, I have disclosed a torque unit capable of performing not only multiplication but addition as well.

Numerous objects and advantages of my invention have been set forth in the foregoing description, together with details of the structure and function of the invention, and the novel features thereof are pointed out in the appended claims. The disclosure, however, is illustrative only, and I may make changes in detail within the principle of the invention, to the full extent indicated by the broad general meaning of the terms in which the appended claims are expressed.

I claim as my invention:

1. A torque-analog computer comprising, in combination: a shaft mounted for rotation; input means connected to said shaft and energizable with electric currents to apply to said shaft a resultant torque which is a function of two of said currents; means supplying to said input means electric currents proportional to a plurality of variable quantities; variably energizable means connected to said shaft for applying variable counter torque thereto; further means connected to said shaft for giving a signal which is a measure of the rotation of the shaft from a normal position; and a double ended amplifier connected to said further means and said variably energizable means for giving a pair of output currents to said variably energizable means whose sum is constant and whose difference is a measure of said signal.

2. A torque-analog computer comprising, in combination: a shaft mounted for rotation; input means connected to said shaft and energizable with electric currents to apply to said shaft a resultant torque which is a function of two of said currents; means supplying to said input means electric currents proportional to a plurality of variable quantities; variably energizable means connected to said shaft for applying variable counter torque thereto; further means connected to said shaft for giving a signal which is a measure of the rotation of the shaft from a normal position; a double ended amplifier connected to said variably energizable means and said further means for giving a pair of output currents to said variably energizable means whose sum is constant and whose difference is a measure of said signal; and means connected to said amplifier for giving an output which is a measure of said difference.

3. Apparatus of the class described comprising, in combination: a closed ferromagnetic stator core having four equally spaced inwardly directed salient poles whose axes intersect perpendicularly at a common point; first, second and third coils wound in the same direction on each of said poles; means connecting said first coils in a first series circuit in such a fashion that when current flows in a selected sense in said circuit the resulting magnetic fluxes in the poles making up first and second diametrically opposed pairs respectively have the same direction; a rotor of ferromagnetic material of low magnetic retentivity having an irregular outline which is bilaterally symmetrical about each of two mutually perpendicular axes of symmetry; means mounting said rotor for rotation about an axis passing through said common point and normal to said axes of symmetry so that said fluxes may maintain said rotor in a normal position; and means connecting said second coils and said third coils in second and third series circuits respectively in such fashions that when current flows in a selected sense in either circuit the resulting magnetic fluxes in the poles making up the first pair aid the fluxes resulting from said current in said first circuit, while the fluxes in the poles making up the second pair oppose the fluxes resulting from said current in said first circuit, so that a torque is applied about the axis of said rotor which is a function of the product of the current in said first circuit multiplied by the sum of the currents in said second and third circuits.

4. Apparatus of the class described comprising, in combination: a ferromagnetic stator core having a plurality of poles defined by intersecting axes; first, second, and third magnetizing coils on each of said poles; means connecting said first coils in a first series circuit in such a fashion that when current flows in said circuit in a selected sense, the resulting magnetic fluxes in the poles making up first and second diametrically opposed pairs respectively having the same direction; a rotor of ferromagnetic material of low magnetic retentivity having at least one axis of bilateral symmetry; means mounting said rotor for rotation about an axis normal to its axis of symmetry in such a fashion that said fluxes may maintain said rotor in a normal position; and means connecting said second coils and said third coils in second and third series circuits respectively in such fashions that when current flows in a selected sense in either circuit the resulting magnetic fluxes in the poles making up the first pair aid the fluxes resulting from said current in said first circuit, while the fluxes in the poles making up the second pair oppose the fluxes resulting from said current in said first circuit, so that a torque is applied about the axis of said rotor which is a function of the product of the current in said first circuit multiplied by the sum of the currents in said second and third circuits.

5. Apparatus of the class described comprising, in combination: a bilaterally symmetrical rotor; a closed stator core having a plurality of poles defined by intersecting axes; means mounting said rotor for rotation about an axis which passes through the intersection of said poles and is perpendicular to the axis of symmetry of said rotor, a plurality of magnetizing windings on each of said poles; means interconnecting first windings on said poles so that when energized electrically in a selected sense said first windings produce magnetic fluxes in said poles which maintain said rotor in a normal position relative to said stator; and means interconnecting second windings and third windings respectively on said poles so that when energized electrically in a selected sense said windings respectively produce magnetic fluxes which in a first of said poles are aligned with, and which in a second of said poles are opposed to, the fluxes caused by said first windings.

6. Apparatus of the class described comprising, in combination: a bilaterally symmetrical rotor; a closed stator core having a plurality of salient poles defined by intersecting axes; means mounting said rotor for rotation about an axis which passes through the intersection of said poles and is perpendicular to the axis of symmetry of said rotor, a plurality of magnetizing coils wound in the same direction on each of said poles; means interconnecting first windings on said poles so that when energized electrically in a selected sense said first windings produce magnetic fluxes in said poles which maintain said rotor in a normal position relative to said stator; and means interconnecting second windings and third windings respectively on said poles so that when energized electrically in a selected sense said windings respectively produce magnetic fluxes which in a first of said poles are aligned with, and which in a second of said poles are opposed to, the fluxes caused by said first windings.

7. A computer comprising, in combination; a shaft; a plurality of rotors of noncircular cross section rotatable unitarily with said shaft; a salient pole stator inductively associated with each of said rotors; means electrically energizing one of said stators with signals representative of a plurality of variable quantities to produce a first torque on said shaft which is a function of said quantities; adjustable means electrically energizing a second of said stators to produce on said shaft a second torque which is equal and opposite to said first torque; and indicating means connected to said second stator.

8. A computer comprising, in combination: a shaft; a plurality of rotors of noncircular cross section rotatable unitarily with said shaft; a salient pole stator inductively associated with each of said rotors; means electrically energizing one of said stators with signals representative of a plurality of variable quantities to produce a first torque on said shaft which is a function of said quantities; adjustable means electrically energizing a second of said stators to produce on said shaft a second torque which is equal and opposite to said first torque; and indicating means connected to a third of said stators.

References Cited in the file of this patent

UNITED STATES PATENTS

| | | |
|---|---|---|
| 1,907,804 | Hausman et al. | May 9, 1933 |
| 2,494,922 | Yardeny | Jan. 17, 1950 |
| 2,532,290 | Cochran | Dec. 5, 1950 |
| 2,535,250 | Allen | Dec. 26, 1950 |
| 2,617,588 | Dobbins | Nov. 11, 1952 |

OTHER REFERENCES

Electronic Analog Computers (Korn and Korn), published by McGraw-Hill Book Co., New York, 1952, pages relied on are 217 and 218.

An Electro-Mechanical Multiplier for Analog Computer Application (Dorsey), proceedings of Electronic Computer Symposium, April 30, May 2, 1952 in Los Angeles (The Los Angeles I.R.E. Group on Electronic Computers with U.C.L.), Nov. 1952, pages V1 to V7.